April 19, 1932.  C. F. BERAN  1,854,732
APPARATUS FOR CARRYING OUT CHEMICAL REACTIONS
Filed April 25, 1928
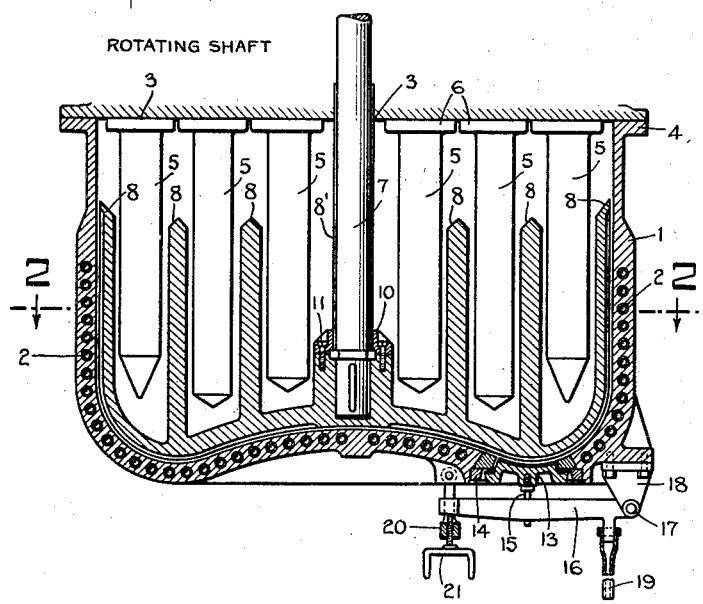
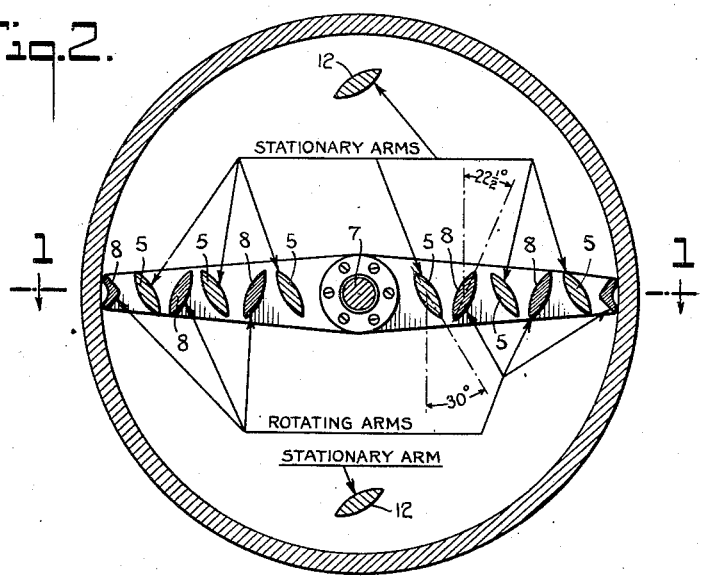
INVENTOR
Charles F. Beran
BY
ATTORNEYS Patented Apr. 19, 1932

1,854,732

UNITED STATES PATENT OFFICE

CHARLES F. BERAN, OF DRUMMONDVILLE, QUEBEC, CANADA, ASSIGNOR TO CELANESE CORPORATION OF AMERICA, A CORPORATION OF DELAWARE

APPARATUS FOR CARRYING OUT CHEMICAL REACTIONS

Application filed April 25, 1928. Serial No. 272,848.

This invention relates to an apparatus for conducting operations wherein it is desired to agitate the material being treated and wherein it is desirable to control the temperature of the chemical reaction by means of a heat exchanging fluid. This application is in part a continuation of my application 247,232, filed January 16, 1928.

An object of my invention is to provide an apparatus for carrying out chemical reactions under perfect control, and which apparatus provides for thorough mixing of the charge, is simple in construction and occupies little floor space.

Another object of my invention is to provide apparatus provided with a stirring mechanism and having means in the walls of the apparatus for circulating a heat exchange fluid, and wherein leakage of the substance being treated is eliminated.

Another object of my invention is to provide an apparatus of this nature which may be easily dismantled for renewal of parts that have become defective.

A further object of my invention is to provide agitating means in a chemical apparatus which insures thorough agitation of the charge, and which may control the direction of flow of the materials therein and the chemical reactions of the charge. Further objects of my invention will appear from the following detailed description.

In accordance with my invention I provide a vessel having a coil for circulating heat exchange fluid therein, which vessel may be entirely closed, and which is provided with stirrers for thoroughly agitating the charge therein. The heat exchange fluid is introduced into coils in the walls of the vessel in any suitable manner so as to obtain any required distribution of the fluid in the walls of the vessel. The stirrer is mounted in such a manner that it may be easily removed, and its height in the vessel easily adjusted. The vessel is provided at its bottom with an easily actuated discharge valve so as to permit the ready removal of the charge. This apparatus is suitable for carrying out any chemical transformations, but it is particularly suitable for the acetylation of cellulose.

Referring to the accompanying drawings:

Figure 1 is a vertical cross section view of the chemical treating apparatus taken along line 1—1 of Figure 2.

Figure 2 is a horizontal cross section taken along the line 2—2 of Figure 1.

The wall 1 of the vessel may be made of cast iron, but it is preferably made of bronze or any other metal that is resistant to the chemicals used in the charge. Within the wall 1 there are cast coils 2, preferably made of steel, for circulating heat exchange fluid. The cover 3 of the vessel may be made of cast iron, but it is preferably made of acid resisting material such as copper or bronze, and is held firmly against the horizontally flanged portion 4 of the wall 1 by any suitable means such as bolts or rivets.

As described in my prior application 247,232, the cover 3 of the vessel is provided with openings closed by two manhole closures, which may be hinged to the cover 3 by hinges and may be securely locked by means of the latches against escape of vapors. One of the manhole closures may be provided with an auxiliary opening that may be closed by the sliding cover to permit the inspection or withdrawal of samples from the charge within the vessel. The other manhole closure may be provided with a vapor proof lighting fixture for illuminating the interior of the vessel. The openings closed by the manhole closures are for charging solid materials to the vessel. The cover 3 may also be provided with vapor outlets for the discharge of vapors that may be formed within the vessel during the process which outlets may lead to any suitable ventilating and/or vapor recovery system. Connections are provided in the cover for the introduction of acid or any other liquid into the treating vessel.

The stationary arms or blades 5 are arranged in a line diametrically across the vessel 1. In order to permit alteration of the angle at which the stationary blades are fixed in the vessel, I preferably fasten the same to the cover 3 by means of bolts passing through slots in the flanges 6 of the arms 5. The slots permit limited angular displacement of the stationary stirrer arms 5 so that the angle may be adjusted prior to screwing the nuts firmly in place on the bolts. A stirrer shaft 7 is suitably mounted within the vessel, which shaft carries the rotating stirrers 8, six of which are shown on the drawings. The stirrer shaft 7 is rotated by means of a bevel gear wheel keyed thereon, which in turn may be driven by a pinion which in turn is rotated by means of any suitable prime mover. However, for reasons set forth below, a reversible electric motor is preferred as the source of power.

The stirrer arm shaft 7 is preferably of steel. To protect it against the action of acids, the part of the shaft within the vessel is surrounded by a copper tube 8′ shrunk thereon. Where the shaft 7 comes through the cover 3, the copper tube 8′ may be protected by another thin tube which acts as a wearing piece. To prevent escape of vapors or fumes from the vessel, a gland may be provided at the point where the shaft protrudes through the cover 3.

To provide agitation of the material in the vessel, the rotating stirrer arm 9, made of acid resisting material, is keyed to the shaft 7. This stirrer arm is provided with the upstanding stirrers 8. These stirrers 8 are disposed at an angle different from that of the stationary stirrers 5. The lower part of the shaft 7 is protected against the action of acids in the vessel by means of a packing ring 10 held in place by the bronze bolts 11.

As described in my application 247,232, the shaft 7 is supported by a main upper bearing, which is constructed so as to permit raising or lowering of the stirrer arm 9 to allow proper clearance between it and the bottom of the vessel 1. For this purpose the shaft may be screw-threaded for engaging threads on a sleeve which rests on the ball bearings of the main upper bearing. By this means the shaft may be raised or lowered at will. Ready access to the ball bearings for the inspection or renewal of the same is obtained by the removal of the housing enclosing the same.

Further to promote agitation of the contents of the vessel 1, two additional stationary stirrers 12 are suspended from the cover 3. These stationary stirrers 12 are set in a plane which intersects the plane wherein the six stationary blades 5 are located at an angle of 90°. I have found that for obtaining maximum efficiency in agitation of the material, the cross sectional shape of the stirrer blades, both the stationary and rotating ones, is of utmost importance. As shown in Figure 2, the cross sections of the blades are curved figures that taper to a point at each end. The stationary blades 5 and 12 are set at an angle of 30° to their tangents, whereas the rotating stirrer blades 8 form an angle of 22½° with their tangents. As shown on the drawings, the free ends of both the stationary and the rotating blades are tapered to a point. The angles of the blades may be varied, thus the angles of the stationary blades may be from 25° to 35°, while that of the rotating blades may be from 18° to 27°.

For discharging the contents of the vessel the valve 13 is provided at the lowermost portion of the vessel 1. The opening in the shell for this valve is clear and free of any obstructions, so as to permit the quick discharge of the contents of the vessel. The valve 13 is fitted and ground in place to the valve seat 14 during construction, in order to insure proper seating at all times. The valve seat is renewable, readily and at low cost. To the valve 13, a rod 15 is secured. This rod is slotted, and through it passes the bell crank lever 16 which is pivoted at 17 on a bearing supported by the saddle 18 attached to the lower part of the vessel. The lever 16 may be actuated manually by the arm 19.

In order to retain the valve 13 in the closed position, the latch 20 is provided for holding the free end of the lever 16 in a horizontal position. The fastening of the latch is attained by the rotation of the wing nut 21.

The operation of the apparatus will now be described. As stated before, this apparatus may be used for any purpose where mixing and/or heating or cooling is necessary. Merely as an illustration of one use to which it may be applied, its use for acetylating cellulose will be described. The valve 13 being closed, the manhole covers are opened and a charge of cellulosic material, such as cotton or wood pulp is dumped into the vessel. The manhole covers are then securedly latched and a charge of a mixture of acetic acid, acetic anhydride and sulphuric acid is introduced through the inlets provided in the cover. In the meantime cold brine is introduced into, and circulated through, the coils 2 in the walls of the vessel 1. Since the coils are distributed throughout the walls of the vessel, a uniform cooling of the vessel is efficiently secured. The stirrer mechanism is now operated in a clockwise direction, thus forcing the charge out against the jacket, where it is cooled. However, when it is found that the temperature of the charge is becoming too low, the motor driving the stirrer shaft is reversed so as to cause the stirrer to rotate in counter clockwise direction, thus drawing the charge away from the jacket and concentrating it towards the center so as to diminish the cooling effect. Any vapors or fumes that are formed during the process are conducted away from the vapor outlet pipes to a suitable ventilating and/or vapor recovery system, thus preventing losses and protecting the operators and adjacent machinery from the action of these fumes. The progress of the acetylation is observed by sliding open the cover and taking samples of the charge, and also by observing the material in the vessel, this being possible because of the light provided by the vapor proof lighting fixture. After the acetylation is completed, wing nut 21 is loosened, the latch 20 is disengaged, and the handle 19 is pulled, thus opening the valve 13 so as to permit the free discharge of the material into a vessel placed thereunder.

It is to be understood that the foregoing details are merely given by way of illustration, and that many variations may be made therein without departing from the spirit of this invention.

Having described my invention, what I claim and desire to secure by Letters Patent is:

1. Apparatus for carrying out chemical reactions comprising a vessel, stirrer blades in said vessel, the horizontal cross section of said stirrer blades being curved figures tapering at each end, the free ends of the stirrer blades being tapered to a point.

2. Apparatus for carrying out chemical reactions comprising a closed vessel, a row of stationary blades suspended from the top of said vessel, a rotatable shaft mounted in said vessel, a stirrer arm mounted on said shaft, blades rising from said stirrer arm, the horizontal cross section of said blades being curved figures tapering at each end, the stationary blades being set at an angle of substantially 30° to their tangent.

3. Apparatus for carrying out chemical reactions comprising a closed vessel, a row of stationary blades suspended from the top of said vessel, a rotatable shaft mounted in said vessel, a stirrer arm mounted on said shaft, blades rising from said stirrer arm, the horizontal cross section of said blades being curved figures tapering at each end, the stationary blades being set at an angle of substantially 30° to their tangent and the rotating stirrer blades being set at an angle of substantially 22½° to their tangent.

4. In apparatus for the acetylation of cellulose, the combination of a vessel made of acid resisting material, a shaft rotatably mounted in said vessel, a stirrer arm fixed to said shaft and spaced from the bottom of said vessel, six aligned upstanding stirrer blades attached to said stirrer arm, six stationary stirrer blades attached to and depending from the cover of said vessel and arranged in a row and two stationary blades arranged in a plane at right angles to the plane of the six stationary blades, the horizontal cross section of said blades being curved figures tapering at each end, the stationary blades being set at an angle of substantially 30° to their tangent, and the rotatable stirrer blades being set at an angle of substantially 22½° to their tangent.

5. Apparatus for carrying out chemical reactions comprising a vessel, a row of vertical stationary blades mounted in substantially parallel relationship in said vessel, a row of vertical rotatable blades mounted in substantially parallel relationship in said vessel, the blades being so mounted that when they are in alignment their axes are at an angle to each other, said rotatable blades being adapted to govern the radial direction of circulation of the material in the vessel by the direction of their rotation.

6. Apparatus for carrying out chemical reactions comprising a vessel, a row of stationary blades mounted in substantially parallel relationship in said vessel, a row of rotatable blades mounted in substantially parallel relationship in said vessel, the blades being so mounted that when they are in alignment their axes are at an angle to each other, said rotatable blades being adapted to govern the radial direction of circulation of the material in the vessel by the direction of their rotation and two stationary blades in a plane at right angles to the plane of the other stationary blades.

7. In apparatus for the acetylation of cellulose the combination of a vessel made of acid resisting material, a shaft rotatably mounted in said vessel, a stirrer arm fixed to said shaft and spaced from the bottom of said vessel, six aligned upstanding stirrer blades mounted in substantially parallel relationship and attached to said stirrer arm, six stationary stirrer blades mounted in substantially parallel relationship and attached to and depending from the cover of said vessel and arranged in a row, and two stationary blades arranged in plane at right angles to the plane of the six stationary blades whereby the radial direction of circulation of the material in the vessel is governed by the direction of the rotation of the rotatable blades.

In testimony whereof, I have hereunto subscribed my name.

CHARLES F. BERAN.